US011169926B2

(12) United States Patent
Ji et al.

(10) Patent No.: US 11,169,926 B2
(45) Date of Patent: Nov. 9, 2021

(54) MEMORY SYSTEM AND MEMORY CONTROLLER CAPABLE OF MINIMIZING LATENCY REQUIRED TO COMPLETE AN OPERATION WITHIN A LIMITED POWR BUDGET AND OPERATING METHOD OF MEMORY CONTROLLER

(71) Applicant: SK hynix Inc., Gyeonggi-do (KR)

(72) Inventors: Seung-Gu Ji, Seoul (KR); Byeong-Gyu Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 44 days.

(21) Appl. No.: 16/661,444

(22) Filed: Oct. 23, 2019

(65) Prior Publication Data

US 2020/0310976 A1 Oct. 1, 2020

(30) Foreign Application Priority Data

Mar. 28, 2019 (KR) .................. 10-2019-0036352

(51) Int. Cl.
*G06F 12/0888* (2016.01)
*G06F 1/3234* (2019.01)
(Continued)

(52) U.S. Cl.
CPC ........ *G06F 12/0888* (2013.01); *G06F 1/3275* (2013.01); *G06F 11/3037* (2013.01); *G06F 11/3062* (2013.01); *G06F 12/0238* (2013.01); *G06F 12/0868* (2013.01); *G06F 13/1689* (2013.01); *G06F 2212/1028* (2013.01)

(58) Field of Classification Search
None
See application file for complete search history.

(56) References Cited

U.S. PATENT DOCUMENTS

2008/0228959 A1* 9/2008 Wang .................... G06F 1/3225
710/22
2010/0211745 A1* 8/2010 Jeddeloh ............... G06F 1/3203
711/137
(Continued)

FOREIGN PATENT DOCUMENTS

| KR | 1998-0032288 | 7/1998 |
| KR | 10-2013-0115090 | 10/2013 |
| KR | 10-2014-0098167 | 8/2014 |

OTHER PUBLICATIONS

Lin et al. "Reducing DRAM Latencies with an Integrated Memory Hierarchy Design." Jan. 2001. IEEE. HPCA-7. pp. 301-312. (Year: 2001).*

(Continued)

*Primary Examiner* — Nathan Sadler
(74) *Attorney, Agent, or Firm* — IP & T Group LLP (57) ABSTRACT

A memory system, a memory controller and an operating method of the memory controller. The memory controller may include a host interface configured to communicate with a host; a memory interface configured to communicate with a memory device; and a control circuit configured to control an operation of the memory device. The control circuit may selectively determine to use a cache for an operation indicated by a command received from the host, depending on a number of memory dies, of a plurality of memory dies in the memory device, detected to be in an activated state.

15 Claims, 8 Drawing Sheets

(51) Int. Cl.
  *G06F 12/02*    (2006.01)
  *G06F 12/0868*  (2016.01)
  *G06F 11/30*    (2006.01)
  *G06F 13/16*    (2006.01)

(56) References Cited

U.S. PATENT DOCUMENTS

| | | | | |
|---|---|---|---|---|
| 2014/0181414 | A1* | 6/2014 | Eckert | G06F 12/0848 |
| | | | | 711/135 |
| 2016/0034400 | A1* | 2/2016 | Dale | G06F 12/0862 |
| | | | | 711/122 |
| 2016/0062768 | A1* | 3/2016 | Jagannathan | G06F 9/30047 |
| | | | | 711/137 |
| 2019/0065243 | A1* | 2/2019 | Eckert | G06F 3/0659 |
| 2019/0163252 | A1* | 5/2019 | Phoenix | G06F 12/0804 |
| 2019/0294553 | A1* | 9/2019 | Gavens | G06F 13/1642 |
| 2019/0324915 | A1* | 10/2019 | Park | G06F 12/0253 |

OTHER PUBLICATIONS

Jiang et al. "CHOP: Adaptive Filter-Based DRAM Caching for CMP Server Platforms." Jan. 2010. IEEE. HPCA-16. (Year: 2010).*

Chen et al. "Adaptive Cache Management for Energy-efficient GPU Computing." Dec. 2014. IEEE. MICRO 2014. pp. 343-355. (Year: 2014).*

* cited by examiner

MEMORY SYSTEM AND MEMORY CONTROLLER CAPABLE OF MINIMIZING LATENCY REQUIRED TO COMPLETE AN OPERATION WITHIN A LIMITED POWR BUDGET AND OPERATING METHOD OF MEMORY CONTROLLER

CROSS-REFERENCE TO RELATED APPLICATION

The present application claims priority to Korean Patent Application No. 10-2019-0036352 filed in the Korean Intellectual Property Office on Mar. 28, 2019, which is incorporated herein by reference in its entirety.

BACKGROUND

1. Technical Field

Various embodiments generally relate to a memory system, a memory controller and an operating method of the memory controller.

2. Related Art

A memory system corresponding to a storage device, stores data based on a request of a host, such as a computer, a mobile terminal such as a smartphone and a tablet, or various other electronic devices. The memory system may include not only a device which stores data in a magnetic disk, such as a hard disk drive (HDD), but also a device which stores data in a nonvolatile memory, such as a solid state drive (SSD), a universal flash storage (UFS) device and an embedded MMC (eMMC) device.

The nonvolatile memory of the memory system may include any of a read only memory (ROM), a programmable ROM (PROM), an electrically programmable ROM (EPROM), an electrically erasable and programmable ROM (EEPROM), a flash memory, a PRAM (phase-change RAM), an magnetic RAM (MRAM), an resistive RAM (RRAM), and an ferroelectric RAM (FRAM).

A memory system corresponding to a storage device includes a memory controller therein. The memory controller may receive commands from a host, and may execute operations indicated by the received commands, for example, operations for reading, writing or erasing data.

SUMMARY

Various embodiments are directed to a memory system, a memory controller and an operating method of the memory controller capable of minimizing a latency required to complete an operation indicated by a command received from a host within a limited power budget.

Also, various embodiments are directed to a memory system, a memory controller and an operating method of the memory controller which control whether to use a cache based on activated states of a plurality of dies in a memory device.

In one aspect, a memory controller to be described in embodiments of the disclosure may include a host interface configured to communicate with a host; a memory interface configured to communicate with a memory device; and a control circuit configured to control an operation of the memory device.

The control circuit may selectively determine to use a cache for an operation indicated by a command received from the host, depending on a number of memory dies, of a plurality of memory dies in the memory device, detected to be in an activated state.

In another aspect, a memory system to be described in embodiments of the disclosure may include a memory device; and a memory controller configured to control the memory device.

The memory controller may selectively determine to use a cache for an operation indicated by a command received from a host, depending on a number of memory dies, of a plurality of memory dies in the memory device, detected to be in an activated state.

In still another aspect, a method for operating a memory controller to be described in embodiments of the disclosure may include determining whether each of a plurality of memory dies in a memory device is in an activated state.

The method for operating a memory controller may include selectively determining to use a cache for an operation indicated by a command received from a host, depending on the number of memory dies determined to be in the activated state.

In still another aspect, an operating method of a controller for controlling plural memory dies may include receiving a request for a memory operation of a selected memory die among the memory dies.

The operating method of a controller may include performing a cache operation for the memory operation when a number of activated memory dies among the memory dies is less than a threshold.

The operating method of a controller may include controlling the selected memory die to perform the memory operation without the cache operation when the number is greater than or equal to the threshold.

Embodiments of the disclosure may provide a memory system, a memory controller and an operating method of the memory controller, capable of minimizing a latency required to complete an operation indicated by a command received from a host within a limited power budget.

Also, embodiments of the disclosure may provide a memory system, a memory controller and an operating method of the memory controller which control whether to use a cache, in consideration of activated states of a plurality of dies in a memory device.

DETAILED DESCRIPTION

Advantages and features of the invention and methods to achieve them will become apparent from the description of various embodiments below with reference to the accompanying drawings. However, the invention is not limited to the disclosed embodiments, as the invention may be implemented in various different ways including variations of any of the disclosed embodiments. The present embodiments are provided for making the disclosure thorough and for fully conveying the scope of the invention to those skilled in the art to which the disclosure pertains. It is to be noted that the scope of the invention is defined only by the claims. Also, throughout the specification, reference to "an embodiment," "another embodiment" or the like is not necessarily to only one embodiment, and different references to any such phrase are not necessarily to the same embodiment(s).

The figures, dimensions, ratios, angles, numbers of elements given in the drawings to describe embodiments of the disclosure are merely illustrative and are not limiting. Throughout the specification, like reference numerals refer to like elements. Moreover, detailed description of known related art may be omitted so as not to unnecessarily obscure features and aspects of the invention. It is further noted that open-ended terms, such as "comprising," "having," "including" and the like, used in the description and claims, should not be interpreted as being restricted to the elements or steps listed thereafter unless specifically stated otherwise. Where an indefinite or definite article is used when referring to a singular noun, e.g. "a," "an," "the," this may include a plural of that noun unless specifically stated otherwise.

In interpreting elements in embodiments of the disclosure, they should be interpreted as including error margins even without explicit statements.

Also, in describing the components of the disclosure, there may be terms used like first, second, A, B, (a), and (b). These are solely for the purpose of differentiating one component from the other but not to imply or suggest the substances, order, sequence or number of the components. If a component is described as "connected," "coupled" or "linked" to another component, it may mean that the component is not only directly "connected," "coupled" or "linked" but also is indirectly "connected," "coupled" or "linked" via a third component. In describing positional relationship, such as "an element A on an element B," "an element A above an element B," "an element A below an element Bi" and "an element A next to an element B," another element C may be disposed between the elements A and B unless the term "directly" or "immediately" is explicitly used.

Features of various embodiments of the disclosure may be coupled, combined or separated partially or totally. Various interactions and operations are possible. Various embodiments can be practiced individually or in combination.

A memory system, a memory controller and an operating method of the memory controller are described below with reference to the accompanying drawings through various embodiments.

Figure 1:
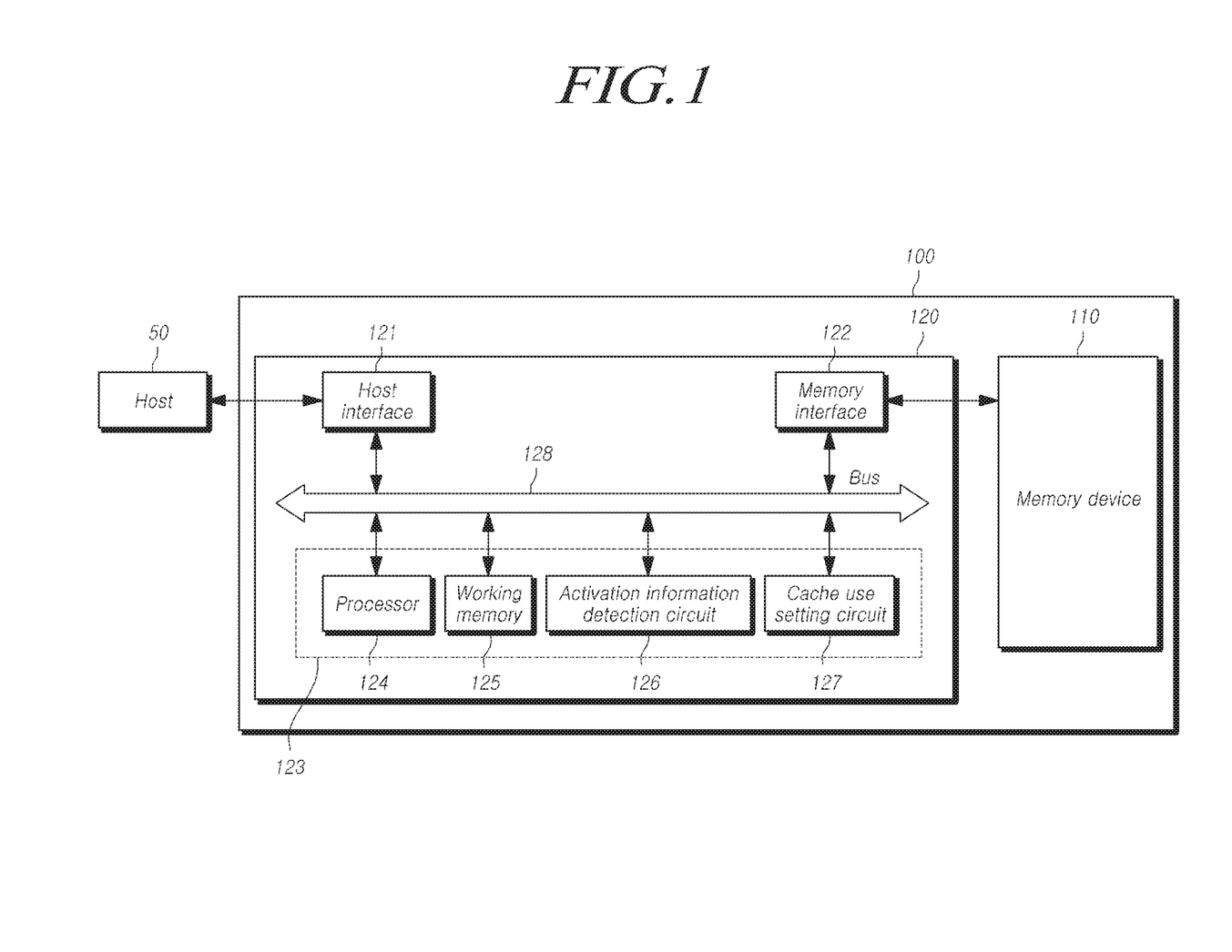
FIG. 1 is a block diagram schematically illustrating a memory system in accordance with an embodiment of the present invention.

FIG. 1 is a block diagram schematically illustrating a memory system 100 in accordance with an embodiment.

Referring to FIG. 1, the memory system 100 may include a memory device 110 and a memory controller 120.

The memory device 110 may store data. The memory device 110 operates in response to the control of the memory controller 120. Operations of the memory device 110 may include, for example, a read operation, a program operation (also referred to as a write operation) and an erase operation.

The memory device 110 may include a memory cell array including a plurality of memory cells which store data. Such a memory cell array may exist in a memory block.

The memory device 110 may be a double data rate synchronous dynamic random access memory (DDR SDRAM), an low power double data rate 4 (LPDDR4) SDRAM, a graphics double data rate (GDDR) SDRAM, an low power DDR (LPDDR), an Rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

The memory device 110 may be realized in a three-dimensional array structure. Embodiments of the disclosure may be applied to not only a flash memory device in which a charge storage layer is configured by a conductive floating gate (FG) but also a charge trap flash (CTF) in which a charge storage layer is configured by a dielectric layer.

The memory device 110 is configured to receive a command and an address from the memory controller 120 and access a region in the memory cell array which is selected by the address. In other words, the memory device 110 may perform an operation corresponding to the command, for a region selected by the address.

For example, the memory device 110 may perform a program operation, a read operation and an erase operation. In the program operation, the memory device 110 may program data to a region selected by the address. In the read operation, the memory device 110 may read data from a region selected by the address. In the erase operation, the memory device 110 may erase data stored in a region selected by the address.

The memory device 110 may include therein a plurality of memory blocks. The memory device 110 may include a plurality of memory dies, and each memory die may include a plurality of memory blocks.

Further, the memory device 110 may include a cache in which data to be used in a read/program operation is temporarily stored. The cache is used to reduce latency when processing commands received from a host 50.

A schematic structure of the memory device 110, in accordance with an embodiment, is described below with reference to FIG. 2.

The memory controller 120 may control the operation of the memory device 110 according to a request of the host 50 or regardless of a request of the host 50. For example, the memory controller 120 may control write, read, erase and background operations for the memory device 110. For example, the background operation may be a garbage collection (GC) operation, a wear leveling (WL) operation, a bad block management (BBM) operation, or the like.

The memory controller 120 may include a host interface 121, a memory interface 122, and a control circuit 123.

The host interface 121 provides an interface for communication with the host 50. When receiving a command from the host 50, the memory controller 120 may receive the command through the host interface 121, and then, may perform an operation of processing the received command.

The memory interface 122 is coupled with the memory device 110 and thereby provides an interface for communication with the memory device 110. That is to say, the memory interface 122 may be configured to provide the interface between the memory device 110 and the memory controller 120 in response to the control of the control circuit 123.

The control circuit 123 performs the general control operations of the memory controller 120, thereby controlling the operations of the memory device 110. To this end, for example, the control circuit 123 may include at least one among a processor 124, a working memory 125, an activation information detection circuit 126 and a cache use setting circuit 127.

The processor 124 may control general operations of the memory controller 120, and may perform a logic calculation. The processor 124 may communicate with the host 50 through the host interface 121, and may communicate with the memory device 110 through the memory interface 122.

The processor 124 may perform the function of a flash translation layer (FTL). The processor 124 may translate a logical block address (LBA) provided by the host 50, into a physical block address (PBA), through the flash translation layer (FTL). The flash translation layer (FTL) may receive the logical block address (LBA) and translate it into the physical block address (PBA), by using a map table. There are various address mapping methods of the flash translation layer, depending on a mapping unit. Representative address mapping methods include a page mapping method, a block mapping method and a hybrid mapping method.

The processor 124 is configured to randomize data received from the host 50. For example, the processor 124 may randomize data received from the host 50, by using a randomizing seed. Randomized data to be stored is provided to the memory device 110 and is programmed to the memory cell array.

The processor 124 is configured to derandomize data received from the memory device 110, in a read operation. For example, the processor 124 may derandomize data received from the memory device 110, by using a derandomizing seed. Derandomized data may be outputted to the host 50.

The processor 124 may drive firmware loaded in the working memory 125 upon booting to control general operations of the memory controller 120 and perform a logic calculation. In other words, in order to control general operations of the memory controller 120 and perform a logic calculation, the processor 124 may execute (drive) firmware loaded to the working memory 125 upon booting. For instance, the firmware may be stored in the memory device 110 and be loaded to the working memory 125.

The firmware as a program executed in the memory system 100 may include, for example, a flash translation layer (FTL) which performs a translation function between a logical address requested to the memory system 100 from the host 50 and a physical address of the memory device 110, a host interface layer (HIL) which serves to analyze a command requested to the memory system 100 from the host 50 and transfers the command to the flash translation layer (FTL), and a flash interface layer (FIL) which transfers a command instructed from the flash translation layer (FTL) to the memory device 110.

The working memory 125 may store firmware, program code, a command and data which are necessary to drive the memory controller 120.

The working memory 125 configured as a volatile memory, for example, may include at least one among an SRAM (static RAM), a DRAM (dynamic RAM) and an SDRAM (synchronous DRAM).

The control circuit 123 to be described in the embodiments may selectively determine to use the cache for an operation indicated by a command received from the host 50, depending on how many of the memory dies in the memory device 110 is/are in an activated state.

An example in which the operation of the control circuit 123 is performed by the activation information detection circuit 126 and the cache use setting circuit 127 is described below.

The activation information detection circuit 126 may detect information on which of the plurality of memory dies in the memory device 110 is in the activated state.

The fact that a memory die is in an activated state means that the memory die is in a state in which an operation (e.g., a read/program/erase operation) indicated by a command received from the host 50 is being performed for at least one among a plurality of memory blocks included in the memory die.

On the other hand, the fact that a memory die is in a deactivated state or an idle state means that the memory die is in a state in which no operation indicated by a command received from the host 50 is being performed in the memory die.

If the memory system 100 is configured such that operations indicated by respective commands received from the host 50 may be simultaneously performed for memory blocks in respective memory dies, such memory dies may be simultaneously activated.

When the plurality of memory dies are simultaneously activated, an amount of power used by the memory device 110 for a specific time may increase. In this case, the power used by the memory device 110 exceed a power budget, which in turn may cause a problem in the operation of the memory device 110.

The power budget means a total amount of power that the memory device 110 may use at a specific point of time, and may also be referred to as a power limit.

Regarding a point of time at which the power budget is determined, for example, the power budget may be determined in a fabrication process step depending on a characteristic of the memory device 110. For another example, the power budget may be dynamically determined depending on an environment information (e.g., an internal temperature/a supplied voltage) of the memory system 100.

Therefore, in order to control the memory device 110 to use power within the available power budget, the memory controller 120 may control the memory device 110 such that the number of memory dies simultaneously activated among the plurality of memory dies in the memory device 110 is less than or equal to a specific threshold value. The threshold value may be defined as a maximum number of activated memory dies and may be predetermined.

The cache use setting circuit 127 may selectively determine to use the cache for an operation indicated by a command received from the host 50, based on the information indicating which of the memory dies is/are detected to be in the activated state by the activation information detection circuit 126. The cache may be included in the memory device 110.

By using the cache in the memory device 110 when processing an operation indicated by a command received from the host 50, operations indicated by a plurality of commands that do not need to be sequentially executed may be simultaneously performed, which may advantageously improve the overall performance of the memory device 110.

In particular, in a mixed workload environment such as when a program operation command is received from the host 50 after a read operation command or vice versa, the possibility for such operations to be simultaneously performed in a specific memory die is high. In such cases, the performance of the memory device 110 may be further improved by processing a command by using the cache.

For example, there may occur a case where, while performing an operation of reading first data stored in a first memory block, an operation of programming second data to a second memory block in the same memory die as the first memory block needs to be performed.

In this case, when the first data is stored in advance in the cache, the first data may be read through the cache, and at the same time, the second data may be programmed to the second memory block. On the other hand, when the cache is not used, since the operation of programming the second data to the second memory block may be performed after the operation of reading the first data is completed, the time at which the operations are completed may be delayed as compared to the case where the cache is used.

As described above, when the cache in the memory device 110 is used, an advantage may be provided in terms of performance. However, if operations indicated by a plurality of commands are simultaneously performed, the number of memory dies in the activated state may increase and thus a problem may be caused in that a possibility that a total amount of power used by the memory device 110 exceeds the power budget available to the memory device 110 becomes high.

Specifically, the more dies in the memory device 110 that are activated during the same time period, the higher a possibility that the memory device 110 exceeds the available power budget becomes.

Thus, the cache use setting circuit 127 may control the cache not to be used when there is a high possibility that the memory device 110 will use an amount of power exceeding the power budget, based on information on memory dies currently activated in the memory device 110, thereby reducing power consumption of the memory device 110.

To this end, the cache use setting circuit 127 may determine the number of memory dies in the activated state, based on the information of the memory dies currently activated in the memory device 110, and may determine whether to use the cache, by comparing the number of memory dies in the activated state to the above-described maximum number of activated memory dies.

For instance, in the case where the number of memory dies in the activated state is less than or equal to the maximum number of activated memory dies, the cache use setting circuit 127 may determine that there is a sufficient margin in power available to the memory device 110, and thereby, may set the cache to be used for an operation indicated by a command received from the host 50.

On the other hand, in the case where the number of memory dies in the activated state is greater than the maximum number of activated memory dies, since a possibility for the memory device 110 to use power exceeding the power budget is high, the cache use setting circuit 127 may set the cache not to be used for an operation indicated by a command received from the host 50.

A detailed operation process of the cache use setting circuit 127 is described below with reference to FIG. 4.

The activation information detection circuit 126 and the cache use setting circuit 127 may be realized in such a manner that the processor 124 executes firmware including a command which instructs operations of the activation information detection circuit 126 and the cache use setting circuit 127.

The activation information detection circuit 126 and the cache use setting circuit 127 may be realized as a module which is included in the processor 124.

A bus 128 may be configured to provide channels among the components of the memory controller 120. The bus 128 may include, for example, a control bus for transferring various control signals, commands and the like, a data bus for transferring various data, and so forth.

The above-described components 121, 122, 124, 125, 126 and 127 of the memory controller 120 are presented by way of example only. One or more of these components may be omitted, and two or more may be combined into one. Of course, the memory controller 120 may include one or more other components as those skilled in the art will understand.

Figure 2:
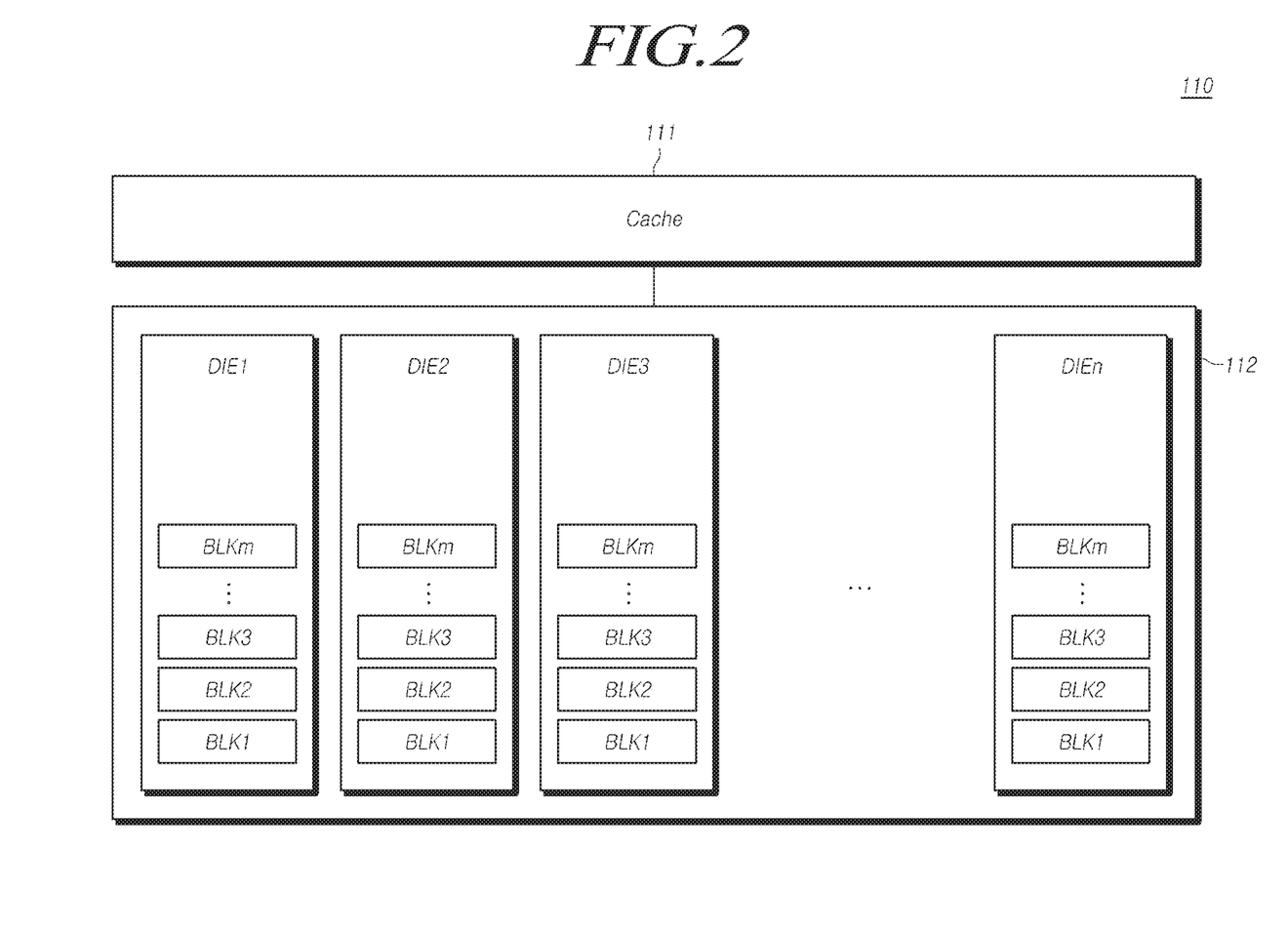
FIG. 2 is a diagram schematically illustrating an example of the memory device illustrated in FIG. 1.

FIG. 2 is a diagram to assist in the explanation of the structure of the memory device 110 illustrated in FIG. 1.

Referring to FIG. 2, the memory device 110 may include a cache 111 in which data to be used in a read/program operation may be temporarily stored. The cache 111 may be realized by a RAM such as an SRAM/DRAM/SDRAM.

While all of a plurality of memory dies 112 in the memory device 110 may be set to be accessible to the entire cache 111, the cache 111 may be divided into regions for the respective memory dies, and each memory die may be set to be accessible to only its respective region of the cache 111.

The memory device 110 may include the plurality of, e.g., n, memory dies 112, where n is a natural number of 2 or greater.

Each of the n memory dies may include m memory blocks, e.g., BLK1, BLK2, BLK3, . . . and BLKm, where m is a natural number of 2 or greater.

In the case where a read or program operation is performed for a memory block in one of the plurality of memory dies 112, at least a part of data to be used in the corresponding operation may be stored in the cache 111.

Figure 3:
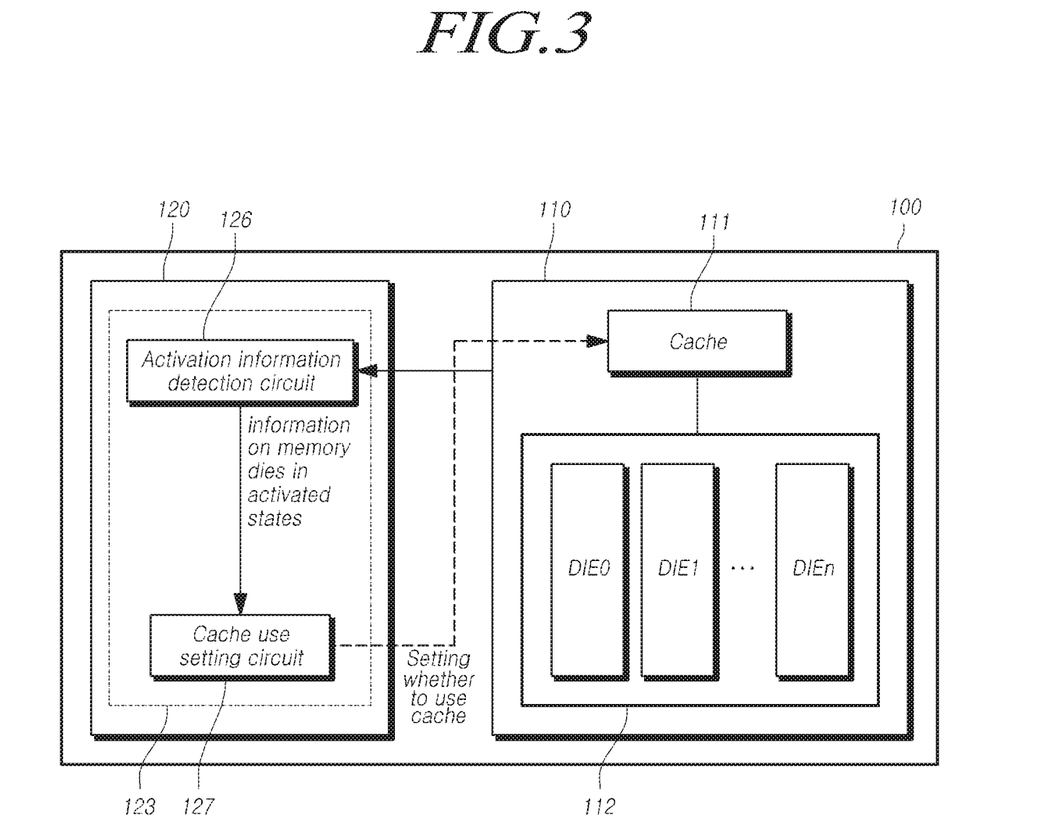
FIG. 3 is a diagram schematically illustrating an example of main components of the memory controller illustrated in FIG. 1.

FIG. 3 is a diagram schematically illustrating an example of main components of the memory controller 120 illustrated in FIG. 1.

Referring to FIG. 3, the activation information detection circuit 126 of the memory controller 120 may detect information on which of the plurality of memory dies in the memory device 110 is/are in the activated state.

The cache use setting circuit 127 of the memory controller 120 may selectively determine to use the cache 111 for an operation indicated by a command received from the host 50, based on the information detected by the activation information detection circuit 126.

For instance, as described above with reference to FIG. 1, the cache use setting circuit 127 may set the cache 111 to be used for an operation indicated by a command received from the host 50 in the case where the number of memory dies in the activated state is less than or equal to the above-described maximum number of activated memory dies, and may set the cache 111 not to be used for an operation indicated by a command received from the host 50 in the case where the number of memory dies in the activated state is greater than the above-described maximum number of activated memory dies.

The maximum number of activated memory dies may be determined as follows.

For instance, the value of the maximum number of activated memory dies may be determined based on information on a power budget available to the memory device 110. If the value of the maximum number of activated memory dies is great, the number of memory dies to be simultaneously activated may also increase and a total amount of power to be used by the memory device 110 may increase. Therefore, the maximum number of activated memory dies may be determined based on the information on a power budget available to the memory device 110.

The information on such power budget may be a fixed value that is determined in a fabrication process of the memory device 110.

For another instance, the value of the maximum number of activated memory dies may be dynamically determined depending on an operation indicated by a command received from the host 50, instead of being set to a fixed value.

Amounts of power to be used to perform operations indicated by commands received from the host 50 are different from one another, and, even for the same command, amounts of power to be used to perform respective detailed operations are different from one another. Thus, by the memory controller 120, the value of the maximum number of activated memory dies may be increased in the case where an amount of power used when an operation indicated by a command received from the host 50 is performed is smaller than a threshold power value, and may be decreased in the case where an amount of power used when an operation indicated by a command received from the host 50 is performed is larger than the threshold power value. For example, an amount of power used when an operation indicated by a command received from the host 50 may be determined by type of the operation (e.g. read/program/erase) and data size corresponding to the operation.

Through this, the performance of the memory device 110 may be maximized while keeping an amount of power used by the memory device 110 less than or equal to a power budget usable available to the memory device 110.

In the above-described example, when determining whether to use the cache 111 for an operation indicated by a command received from the host 50 based on the number of memory dies in the activated state, a number of memory dies corresponding to one channel may be additionally considered. A channel may mean a logical coupling that is set for transmission/reception of a command between the host 50 and the memory system 100.

For example, in the case where the number of memory dies coupled to the memory controller 120 through a channel corresponding to a command received from the host 50 is equal to or greater than a preset threshold number of dies, the cache use setting circuit 127 may set the cache 111 not to be used for an operation indicated by the corresponding command regardless of the number of activated memory dies. If the number of memory dies coupled to the memory controller 120 through one channel is great, those memory dies corresponding to the channel are sequentially accessed in the process of processing a command corresponding to the channel, and in this case, even though the cache 111 is used, there is no or little effect of improving the performance of processing an operation indicated by the command.

Figure 4:
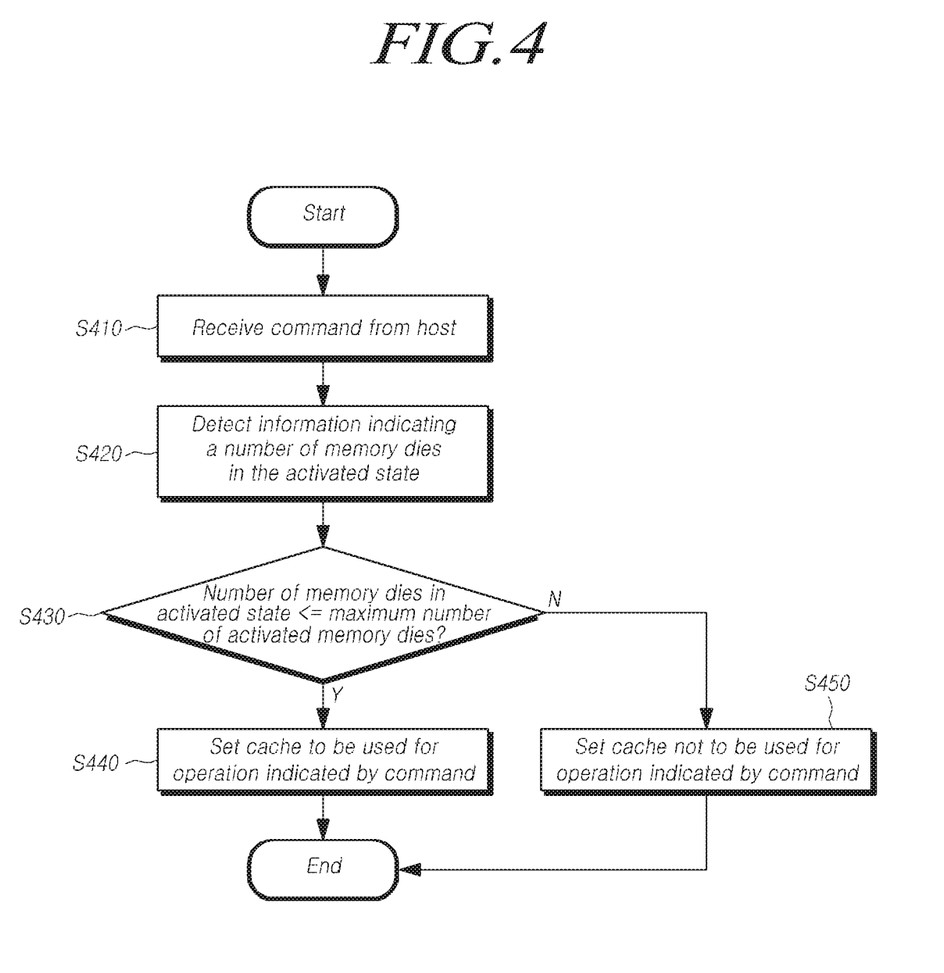
FIG. 4 is a flow chart to assist in the explanation of a process of setting whether to use a cache for a command received from a host, in accordance with an embodiment of the present invention.

FIG. 4 is a flow chart to assist in the explanation of a process of setting whether to use the cache for a command received from the host 50, in accordance with an embodiment.

An example in which the present process is performed by the memory controller 120 is described below.

Referring to FIG. 4, the memory controller 120 may receive a command from the host 50 through the host interface 121 (S410).

The activation information detection circuit 126 of the memory controller 120 may detect information indicating a number of the plurality of memory dies in the memory device 110 in the activated state (S420).

Based on the information obtained at step S420, the cache use setting circuit 127 of the memory controller 120 may compare the number of memory dies in the activated state to the maximum number of activated memory dies (S430). The maximum number may be preset.

In the case where the number of memory dies in the activated state is less than or equal to the maximum number of activated memory dies (S430-Y), the cache use setting circuit 127 of the memory controller 120 may set the cache to be used for an operation indicated by the command received at the step S410 (S440).

On the other hand, in the case where the number of memory dies in the activated state is greater than the maximum number of activated memory dies (S430-N), the cache use setting circuit 127 of the memory controller 120 may set the cache not to be used for an operation indicated by the command received at the step S410 (S450).

Figure 5:
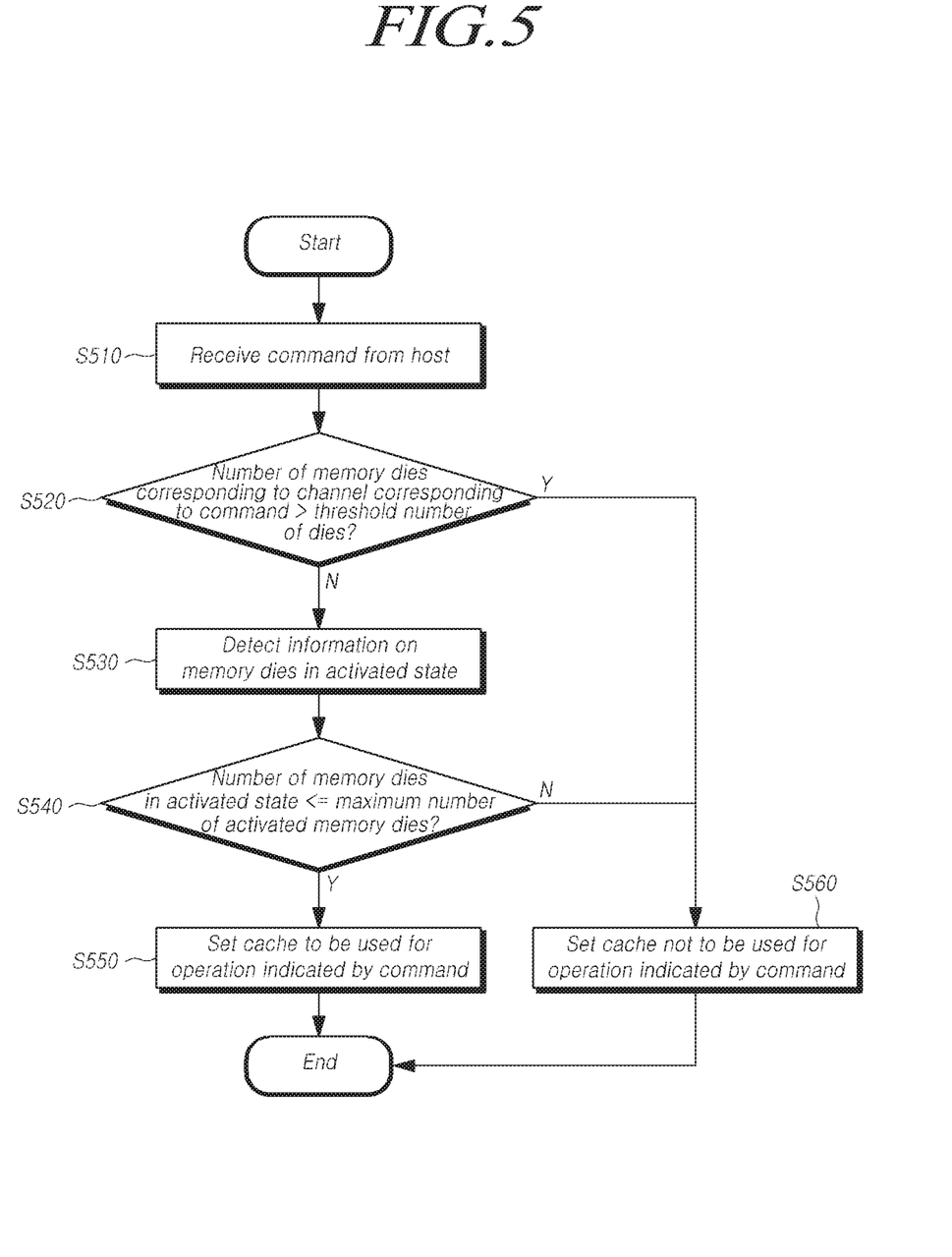
FIG. 5 is a flow chart to assist in the explanation of another process of setting whether to use a cache for a command received from a host, in accordance with an embodiment of the present invention.

FIG. 5 is a flow chart to assist in the explanation of another process of setting whether to use the cache for a command received from the host 50, in accordance with an embodiment.

An example in which the present process is performed by the memory controller 120 is described below.

Referring to FIG. 5, the memory controller 120 may receive a command from the host 50 through the host interface 121 (S510).

The cache use setting circuit 127 of the memory controller 120 may determine whether the number of memory dies coupled to the memory controller 120 through a channel corresponding to the command is greater than the threshold number of dies, as described above with reference to FIG. 3 (S520). If the number of such memory dies is greater than the threshold number of dies (S520-Y), the cache use setting circuit 127 may set the cache not to be used for an operation indicated by the command, as described above with reference to FIG. 3 (S560).

On the other hand, if the number of such memory dies is less than or equal to the threshold number of dies (S520-N), a process similar to FIG. 4 may be performed.

After the step S520, the activation information detection circuit 126 of the memory controller 120 may detect information regarding the number of the plurality of memory dies in the memory device 110 in the activated state (S530).

Based on the information obtained at step S530, the cache use setting circuit 127 of the memory controller 120 may compare the number of memory dies in the activated state to the maximum number of activated memory dies (S540).

In the case where the number of memory dies in activated state is less than or equal to the maximum number of activated memory dies (S540-Y), the cache use setting circuit 127 of the memory controller 120 may set the cache to be used for an operation indicated by the command received at the step S510 (S550).

On the other hand, in the case where the number of memory dies in activated state is greater than the maximum number of activated memory dies (S540-N), the cache use setting circuit 127 of the memory controller 120 may set the cache not to be used for an operation indicated by the command received at the step S510 (S560).

Figure 6:
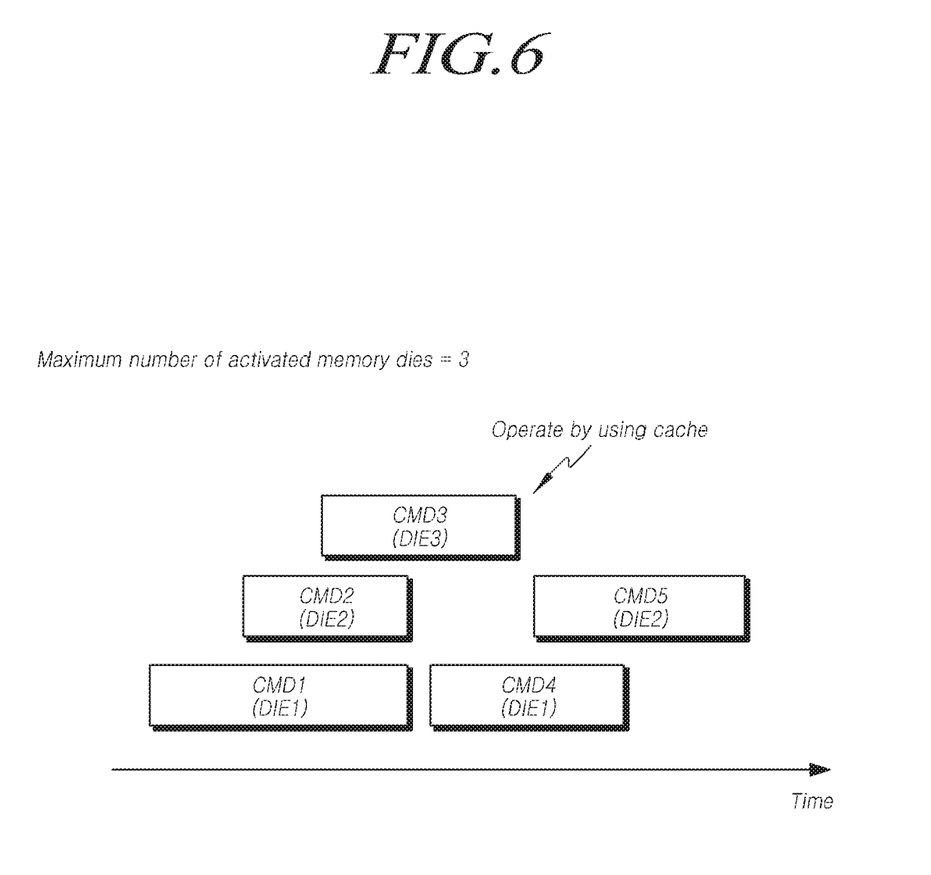
FIG. 6 is a diagram to assist in the explanation of processing a plurality of commands received from the host, with the lapse of time, in accordance with an embodiment of the present invention.

FIG. 6 is a diagram to assist in the explanation of processing a plurality of commands received from the host 50, with the lapse of time, in accordance with an embodiment.

In FIG. 6, it is assumed that the maximum number of activated memory dies is set to 3.

In FIG. 6, it is assumed that, while operations indicated by a command CMD1 for accessing a memory die DIE1 and a command CMD2 for accessing a memory die DIE2 are being performed, a command CMD3 for accessing a memory die DIE3 is received from the host 50.

In this case, because the maximum number of activated memory dies is currently set to 3, an operation indicated by the command CMD3 may be performed simultaneously with the operations indicated by the commands CMD1 and CMD2. Therefore, since the operation indicated by the command CMD3 may be performed by using the cache, the cache use setting circuit 127 may set the cache to be used for the operation indicated by the command CMD3.

Figure 7:
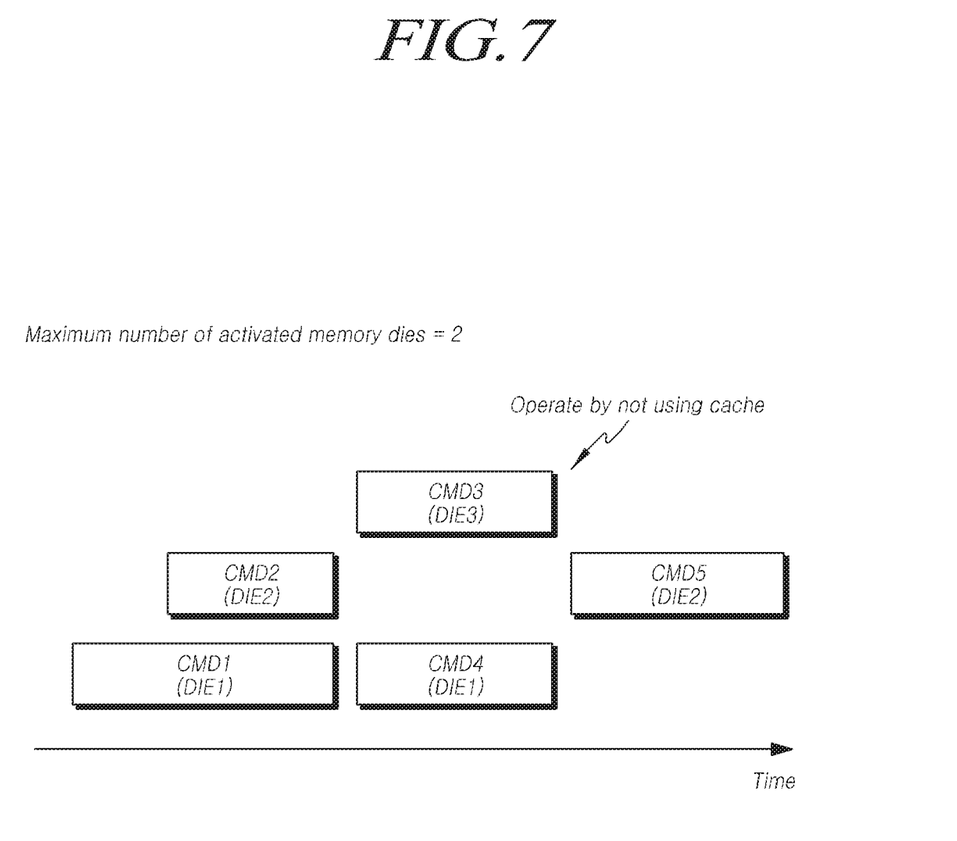
FIG. 7 is a diagram to assist in the explanation of processing a plurality of commands received from the host, with the lapse of time, in accordance with another embodiment of the present invention.

FIG. 7 is a diagram to assist in the explanation of processing a plurality of commands received from the host 50, with the lapse of time, in accordance with another embodiment.

In FIG. 7, it is assumed that the maximum number of activated memory dies is set to 2.

In FIG. 7, it is assumed that, while operations indicated by a command CMD1 for accessing a memory die DIE1 and a command CMD2 for accessing a memory die DIE2 are being performed, a command CMD3 for accessing a memory die DIE3 is received from the host 50.

In this case, because the maximum number of activated memory dies is currently set to 2, unlike the case of FIG. 6, an operation indicated by the command CMD3 cannot be performed simultaneously with the operations indicated by the commands CMD1 and CMD2. Therefore, since the operation indicated by the command CMD3 may not be performed by using the cache, the cache use setting circuit 127 may set the cache not to be used for the operation indicated by the command CMD3.

Figure 8:
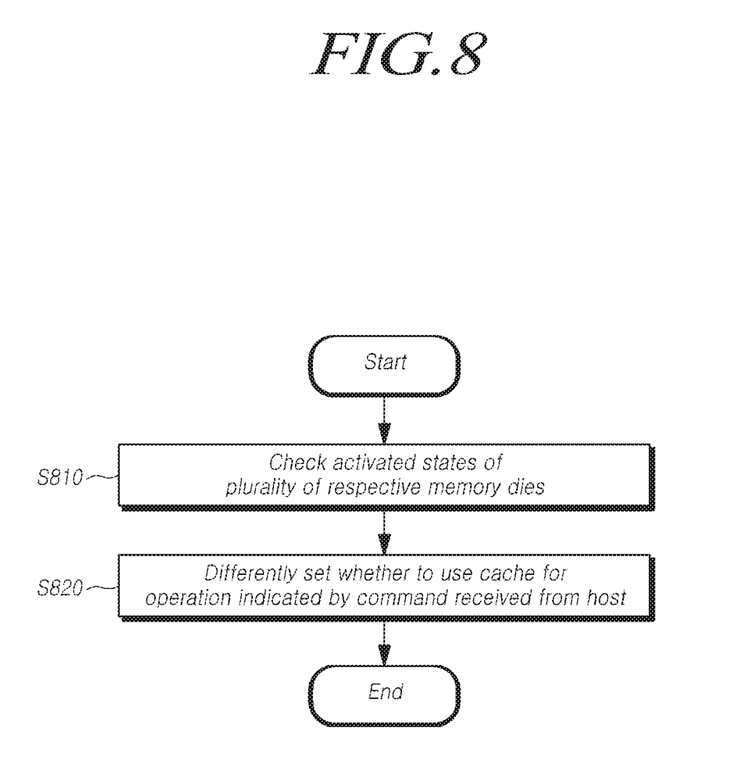
FIG. 8 is a flow chart to assist in the explanation of a method for operating a memory controller in accordance with an embodiment of the present invention.

FIG. 8 is a flow chart to assist in the explanation of a method for operating the memory controller 120 in accordance with an embodiment.

An example in which the present method is performed by the memory controller 120 is described below.

First, whether or not each of the plurality of memory dies in the memory device 110 is in the activated state may be determined (S810). The operation at the step S810 may be performed in such a manner that the activation information detection circuit 126 of the memory controller 120 detects a number of the plurality of memory dies in the memory device 110 in the activated state.

Depending on the information obtained at step S810, the cache use setting circuit 127 of the memory controller 120 may set whether to use the cache for an operation indicated by a command received from the host 50 (S820).

At the step S820, whether to use the cache for an operation indicated by a command received from the host 50 may be determined based on the maximum number of activated memory dies described above with reference to FIG. 1, and the process described above with reference to FIG. 4 may be applied.

At the step S820, whether to use the cache for an operation indicated by a command received from the host 50 may be determined not only based on the maximum number of activated memory dies but also based on the number of memory dies coupled to the memory controller 120 through a common channel, and the process described above with reference to FIG. 5 may be applied.

As described above with reference to FIG. 3, the maximum number of activated memory dies may be determined based on information on a power budget available to the memory device 110 or depending on an operation indicated by a command received from the host 50.

Through the above-described embodiments of the disclosure, a memory system, a memory controller and an operating method of the memory controller capable of minimizing latency required to complete an operation indicated by a command received from a host within a limited power budget is provided.

Also, through the embodiments of the disclosure, a memory system, a memory controller and an operating method of the memory controller which control whether to use a cache based on which of a plurality of dies in a memory device is/are in an activated state, are provided.

Although various embodiments have been illustrated and described, those skilled in the art will appreciate that various modifications, additions and substitutions are possible, without departing from the scope and spirit of the disclosure. Therefore, the disclosed embodiments should be considered in a descriptive sense only and not for limiting the scope of the present invention. The present invention is defined by the appended claims and encompasses all equivalents falling within the scope of the appended claims.

What is claimed is:

1. A method for operating a memory controller which controls a memory device, the method comprising:
   determining whether each of a plurality of memory dies in the memory device is in an activated state; and
   selectively determining, when an operation indicated by a command is executed, whether or not to use a cache data corresponding to the command received from a host, depending on the number of memory dies determined to be in the activated state.

2. The method according to claim 1,
   wherein the selectively determining operation includes determining to use the cache for caching data corresponding to the command when the number of memory dies in the activated state is less than or equal to a maximum number of activated memory dies, and
   wherein the selectively determining operation includes determining not to use the cache for caching data corresponding to the command when the number of memory dies in the activated state is greater than the maximum number of activated memory dies.

3. The method according to claim 2, further comprising determining the maximum number of activated memory dies based on information on a power budget available to the memory device.

4. The method according to claim 2, further comprising determining the maximum number of activated memory dies based on the operation indicated by the command.

5. The method according to claim 2, wherein the selectively determining operation further includes determining not to use the cache for caching data corresponding to the command in the case where a number of memory dies coupled to the memory controller through a channel corresponding to the command is greater than or equal to or a threshold number of dies.

6. A memory system comprising:
   a memory device including a plurality of memory blocks; and a memory controller configured to control the memory device, wherein the memory controller selectively determines, when an operation indicated by a command is executed, whether or not to use a cache data corresponding to the command received from a host, depending on a number of memory dies, of a plurality of memory dies in the memory device, detected to be in an activated state.

7. The memory system according to claim 6, wherein the memory controller determines to use the cache for caching data corresponding to the command when the number of memory dies in the activated state is less than or equal to a maximum number of activated memory dies, and wherein the control circuit determines not to use the cache for caching data corresponding to the command when the number of memory dies in the activated state is greater than the maximum number of activated memory dies.

8. The memory system according to claim 7, wherein the memory controller determines the maximum number of activated memory dies based on information on a power budget available to the memory device.

9. The memory system according to claim 7, wherein the memory controller determines the maximum number of activated memory dies depending on the operation indicated by the command.

10. The memory system according to claim 7, wherein the memory controller determines not to use the cache for caching data corresponding to the command in the case where a number of memory dies coupled to the memory controller through a channel corresponding to the command is greater than or equal to a threshold number of dies.

11. A memory controller comprising:

a host interface configured to communicate with a host;

a memory interface configured to communicate with a memory device; and a control circuit configured to control an operation of the memory device, wherein the control circuit selectively determines when an operation indicated by a command is executed, whether or not to use a cache data corresponding to the command received from the host, depending on a number of memory dies, of a plurality of memory dies in the memory device, detected to be in an activated state.

12. The memory controller according to claim 11, wherein the control circuit determines to use the cache for caching data corresponding to the command when the number of memory dies in the activated state is less than or equal to a maximum number of activated memory dies, and wherein the control circuit determines not to use the cache for caching data corresponding to the command when the number of memory dies in the activated state is greater than the maximum number of activated memory dies.

13. The memory controller according to claim 12, wherein the maximum number of activated memory dies is determined based on information on a power budget available to the memory device.

14. The memory controller according to claim 12, wherein the maximum number of activated memory dies is determined based on the operation indicated by the command.

15. The memory controller according to claim 12, wherein the control circuit determines not to use the cache for caching data corresponding to the command in the case where a number of memory dies coupled to the memory controller through a channel corresponding to the command is greater than or equal to a threshold number of dies.

* * * * *